UNITED STATES PATENT OFFICE.

MICHAEL M. LIPPS, OF BLUFF CITY, TENNESSEE.

METHOD OF MAKING FERTILIZERS.

SPECIFICATION forming part of Letters Patent No. 686,744, dated November 19, 1901.

Application filed January 31, 1901. Serial No. 45,513. (No specimens.)

*To all whom it may concern:*

Be it known that I, MICHAEL M. LIPPS, a citizen of the United States, residing at Bluff City, in the county of Sullivan and State of Tennessee, have invented a new and useful Process of Manufacturing Compost Fertilizers, of which the following is a specification.

This invention relates to improvements in processes for the manufacture of compost fertilizers, and has for its object the provision of a new process for the manufacture of a fertilizer from the manure of the barn-yard in connection with certain cheap chemicals hereinafter named.

The process has for its further object the production of a fertilizer in which the fibrous material is entirely broken up and disintegrated, so that all the plant nourishment is released therefrom, but is retained in the compound in a condition available to the plant.

A still further object is to provide a process which can be readily carried out by any farmer upon his own ground and which embodies chemicals that are exceedingly inexpensive and readily obtainable. Furthermore, a fertilizer is produced which is in a finely-powdered condition, and unlike all others of this class of which I am aware may be fed, together with the grain, through the ordinary grain-drill, such as is used in the planting of wheat and grain of a similar character. It will also retain its nourishing elements for an indefinite period and can thus be stored away—a valuable advantage over those which when made must necessarily be used immediately.

In carrying out the present process the ingredients preferably employed are manure, earth, sulfate of ammonia, chlorid of sodium, acid phosphate, lime, nitrate of soda, and muriate of potash.

In the manufacture of a ton of this fertilizer about two parts of manure and about one part of dirt, together with chemicals in about the following proportions, are employed: Fourteen-per-cent. acid phosphate, one hundred pounds; lime, one hundred pounds; muriate of potash, fifty pounds; nitrate of soda, (saltpeter,) twenty-five pounds; chlorid of sodium, (salt,) twenty-five pounds; sulfate of ammonia, five pounds.

In carrying out the process a box or vat seven feet long, three feet wide, and two feet in depth, containing about forty-two cubic feet, is employed. By experiment it has been found that this box will hold about one ton of the compost made by my process. Of course it will be understood that neither the size nor shape of the box or vat has any connection with the process, the above dimensions being given merely for the purpose of convenience to those using the process. It is also further obvious that this process might be carried out without the use of a box or vat; but it is preferable to use one, as the results obtained thereby are more satisfactory. When a large amount of the compost is to be made, it will be obvious that a larger box or vat will be used.

In carrying out the process a quantity of manure is taken and reduced to a well-chopped condition free from lumps. A sufficient quantity of this finely-chopped material is then placed in a layer in the box or vat to the depth of about two inches. On top of this layer of manure is sprinkled or sifted about one-half of a pound of sulfate of ammonia, this ammonia being used for its plant-food value and to assist in balancing the fertilizer. On top of this layer or sprinkling of ammonia there is sifted or otherwise spread about two and one-half pounds of chlorid of sodium. This chlorid of sodium is employed for the purpose of drawing to and concentrating moisture in the mixture to aid in its decomposition. Furthermore, the chlorin contained therein is beneficial in preventing rust from attacking the plant life and also has the effect of killing or preventing grubs or other insects which attack the roots of young plants. On the chlorid of sodium is then sprinkled or spread a layer containing about ten pounds of acid phosphate. This phosphate is used for its phosphoric acid, that is a well-known plant-food, and also for the sulfuric acid, which decomposes and disintegrates the woody or vegetable fiber of the manure, thus releasing the plant-food it contains, which is made immediately available. About five pounds of lime is sprinkled or sifted on top of the acid phosphate in the box or vat. This lime is used to assist in the decomposition of the manure and also to assist in retaining in the compound the valuable gaseous ammonia released by the other ingredients. The lime is also, as is well known, a very important element in plant life and is necessary to the full development thereof. After the first layer of manure has been treated as above described another layer is placed in the box or vat and treated in the same manner, and the operation is repeated until the box or vat is about half full, the mixture having been thoroughly packed or compressed at about every second layer of manure that has been placed in the box for the purpose of preventing an excess of air remaining therein and causing a too-rapid fermentation, with a consequent high temperature and burning of the plant-food. When a sufficient number of layers of the composition have been placed in the vat, a layer of dirt, preferably rich loam, to the depth of one inch is placed over the whole. The dirt is used to give weight and body to the mass, to arrest and hold the gases that arise from the manure layers beneath, and for the plant-food elements it contains. About two pounds of nitrate of soda is spread evenly over this loam, and about four pounds of muriate of potash is spread over the nitrate of soda. On top of the potash is then spread or sprinkled about four pounds of lime. The lime is used in the dirt as a drier and also to catch and hold any gases that the dirt might fail to absorb. The nitrate of soda and muriate of potash are used in the compound for their plant-food value and for the purpose of keeping the fertilizer balanced. The above operation is repeated as often as may be desired or until the box or vat is filled. The compound is then allowed to stand for a period of from sixty to ninety days, according to the temperature, after which the compost may be broken into and either used as a fertilizer immediately or may be put away in bags or barrels for future use. If the compost is wet when broken into, it is allowed to air-dry a few days and then is worked thoroughly. If it is desired to use the compost in a drill, it is advisable to sift the same to clear it of lumps. After being sifted it should be allowed to stand and be thoroughly dried by the air.

There are several important advantages over this process. In the first place, the vegetable and fibrous structure of the manure is completely broken down and disintegrated, so that the important and valuable elements that go to make up the plant-food are released. At the same time these elements do not escape from the mass, but are taken up by and incorporated with the other ingredients. By this process also complete nitrification takes place while the materials are in the above-described relation. For this reason, therefore, the fertilizer after the process is finished can be kept for an indefinite length of time and does not have to be immediately placed in the soil, as do those in which the process has only been begun and the valuable properties would be lost entirely if not immediately applied. A further advantage resides in the fact that the resultant fertilizer is in the form of a dry powder, which can thus be used in an ordinary drill. So far as I am aware ordinary manure has never been reduced to this form heretofore. Finally, the process is exceedingly simple, the ingredients inexpensive and readily obtainable, and all contain elements which in themselves are excellent plant-food.

Should it be desired to hasten the process and reduce the number of days the compound must stand, it is only necessary to mix twelve pounds of commercial sulfuric acid and ten gallons of water and sprinkle each layer of manure with about a gallon of the same before applying the other chemicals. This will hasten the decomposition of the manure, so that the resultant fertilizer will be ready for use in about two weeks. Under ordinary conditions, however, it is unnecessary to use this last ingredient, and as it adds to the expense and is rather dangerous to handle it is preferably not employed.

From the foregoing it is thought that the construction, operation, and many advantages of the herein-described invention will be apparent to those skilled in the art without further description, and it will be understood that changes in the proportions of the ingredients and their relation to each other may be resorted to without departing from the spirit or sacrificing any of the advantages of the invention, provided such changes are within the scope of the appended claims.

Having thus described my invention, what I claim as new, and desire to secure by Letters Patent, is—

1. The herein-described process consisting in spreading a quantity of manure in a layer, placing thereon chlorid of sodium and acid phosphate, covering the same with earth and lime, and allowing the mass to stand for a determinate period.

2. The herein-described process consisting first in taking a quantity of finely-divided manure and spreading the same in a layer, and successively spreading or sifting thereover quantities of sulfate of ammonia, chlorid of sodium, acid phosphate and lime, and repeating said operation until a plurality of layers have been formed; secondly, spreading over this composition a suitable layer of earth upon which is spread nitrate of soda, muriate of potash and lime, in succession; and thirdly, allowing the whole to stand to effect the chemical changes and the decomposition of the fibrous material of the constituent elements.

3. The herein-described process, consisting first in reducing ordinary barn-yard manure to a finely-divided condition, spreading it in a layer, and sprinkling successively over this layer a quantity of sulfate of ammonia, a quantity of chlorid of sodium, a quantity of acid phosphate and a quantity of lime; secondly, taking a quantity of earth and spreading the same over the top of the lime and spreading successively over this layer of earth, a quantity of nitrate of soda, muriate of potash, and lime; and thirdly, allowing the resulting mixture to stand for a period.

4. The herein-described process consisting first in reducing ordinary barn-yard manure to a finely-divided condition, spreading it in a layer and sprinkling over this layer successively, a quantity of sulfate of ammonia, chlorid of sodium, acid phosphate, and lime; secondly, taking a quantity of earth and spreading the same over the top of the lime and spreading successively a quantity of nitrate of soda, muriate of potash and lime over said earth; thirdly, allowing the resulting mixture to stand for a given period, and lastly, chopping the compound or compost and sifting the same.

In testimony that I claim the foregoing as my own I have hereto affixed my signature in the presence of two witnesses.

MICHAEL M. LIPPS.

Witnesses:
 ROBERT W. RUSH,
 FRED H. WEBB.